United States Patent
Runyan et al.

(10) Patent No.: US 11,522,717 B2
(45) Date of Patent: Dec. 6, 2022

(54) SIGNATURE TOKEN SYSTEM

(71) Applicants: Christopher Lee Runyan, Bailey, CO (US); Matthew Jeremy Runyan, Columbia, MD (US)

(72) Inventors: Christopher Lee Runyan, Bailey, CO (US); Matthew Jeremy Runyan, Columbia, MD (US)

(73) Assignee: Signa Tech LLC, Conifer, CO (US)

( * ) Notice: Subject to any disclaimer, the term of this patent is extended or adjusted under 35 U.S.C. 154(b) by 198 days.

(21) Appl. No.: 16/934,930

(22) Filed: Jul. 21, 2020

(65) Prior Publication Data

US 2021/0028944 A1 Jan. 28, 2021

Related U.S. Application Data

(60) Provisional application No. 62/877,314, filed on Jul. 23, 2019.

(51) Int. Cl.
*H04L 9/32* (2006.01)

(52) U.S. Cl.
CPC .......... *H04L 9/3247* (2013.01); *H04L 9/3213* (2013.01)

(58) Field of Classification Search
None
See application file for complete search history.

(56) References Cited

U.S. PATENT DOCUMENTS

| | | | |
|---|---|---|---|
| 6,285,760 B1 | 9/2001 | Crandall | |
| 6,393,126 B1 | 5/2002 | van der Kaay | |
| 7,603,560 B2 | 10/2009 | Crandall | |
| 7,665,141 B2 | 2/2010 | Young | |
| 7,934,098 B1 | 4/2011 | Hahn | |
| 8,251,283 B1* | 8/2012 | Norton | G06K 19/06187 |
| | | | 705/76 |
| 8,970,561 B2 | 3/2015 | Xu | |
| 9,350,555 B2 | 5/2016 | Oswalt | |
| 9,363,258 B2 | 6/2016 | Boyer | |
| 9,369,287 B1 | 6/2016 | Sarvestani | |
| 9,679,190 B2 | 6/2017 | Bartlett, II | |
| 9,698,992 B2* | 7/2017 | Gertner | G06F 21/36 |
| 2013/0205380 A1* | 8/2013 | Avni | H04W 12/068 |
| | | | 726/7 |
| 2018/0139204 A1* | 5/2018 | Votaw | G06T 11/60 |

\* cited by examiner

*Primary Examiner* — William J. Goodchild
*Assistant Examiner* — Mayasa A. Shaawat
(74) *Attorney, Agent, or Firm* — Midtown Intellectual Property, PC; C A Schlecht

(57) ABSTRACT

The present disclosure provides a system for generation and verification of signatures via user specific tokens. This system allows a user to create a token to include with or use instead of a signature, with the token generally called a "Signature Token." The Signature Token may be a numeric token, alphanumeric token, or other appropriate character set. The system may additionally determine or assign a signature level to a signature token based on the user device information, signature information, or some combination thereof. A Signature Token can be verified by a third party, thereby authenticating the user's signature. The system provides easy access for the creation of signature tokens and verifying the tokens.

10 Claims, 5 Drawing Sheets

SIGNATURE TOKEN SYSTEM

This application claims the benefit of priority of U.S. Provisional Patent Application Ser. No. 62/877,314 filed Jul. 23, 2019, the disclosure of which is incorporated by reference in its entirety for all purposes.

BACKGROUND

Aspects of the present disclosure enable the creation of electronically verifiable signatures for any instance where a signature—whether physical or electronic—may be used or required. This verifiable signature provides proof of the purpose, identity, voluntariness, and authenticity of a signature.

Current, known methods of electronic signatures use a public-private key cryptographic signature. As known in the art, these types of signature require a public key published on an accessible, public server and the "signature" is used to authenticate a completed document. In other words, current methods authenticate the document rather than authenticating the actual act of signing and the identity of the signor. Since these cryptographic signatures are document-centric, rather than signor/signing-centric, current electronic signatures are not adequate for, or generally even capable of, providing proof of the purpose, identity, voluntariness, and authenticity of a signature.

BRIEF SUMMARY

The following presents a simplified summary to provide a basic understanding of some aspects of the disclosure. This summary is not an extensive overview. It is not intended to identify key or critical elements of the disclosure or to delineate the scope of the disclosure. The following summary merely presents some concepts of the disclosure in a simplified form as a prelude to the more detailed description provided below.

Aspects of the present disclosure relate to one or more methods, systems, apparatuses, applications, or some combination thereof. Aspects of the present disclosure enable the creation of electronically verifiable signatures for use in any instance where a signature—whether physical or electronic—may be used or required. This verifiable signature provides proof of the purpose, identity, voluntariness, and authenticity of a signature. Aspects of the present disclosure include a computerized method for signing a document with a digital token. The method comprises, among other things, collecting, from a user device of a signor, device information regarding the device, with the device information including location data of the device, and then receiving, from the signor via the device, signature information from the signor, with the signature information including data indicating a purpose of the signature. The method further includes, among other things, transmitting, from the user device, the signature information to a server via a network, storing, by the server, the signature information to one or more data stores, and then generating, by the server, a signature token based on the received signature information. The method additionally includes transmitting, by the server, the signature token to the user device, signing, by the signor on the user device, one or more documents using the transmitted signature token. Aspects of the present disclosure additionally include a computerized method for verifying, by a third party, a signature based on a signature token used to sign a document. The method includes, among other things, collecting, via a website transmitted by a server, the signature token to be verified, verifying the signature based on the collected signature token, then based on verifying the signature, selectively generating verification results indicating a verification status of "success" or "failure".

Figure 1:
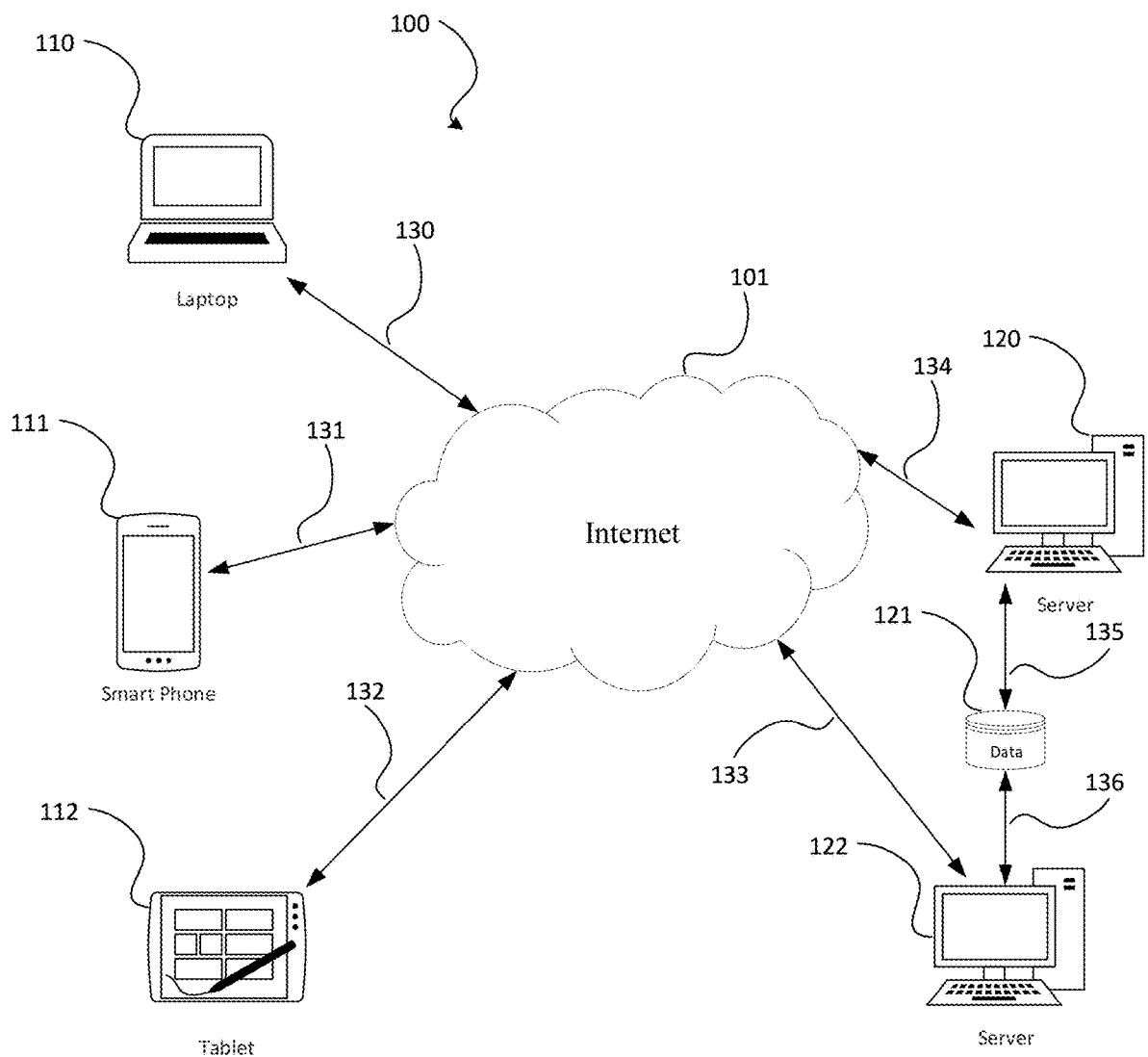
FIG. 1 illustrates one or more aspects of an exemplary signature creation environment, processes, and functionality, according to various aspects described herein.

One of ordinary skill in the pertinent arts will recognize that, while various aspects of the present disclosure are illustrated in the Figures as separate elements, one or more of the elements may be combined, merged, omitted, or otherwise modified without departing from the scope of the present disclosure.

DETAILED DESCRIPTION

In the following description of the various embodiments, reference is made to the accompanying drawings, which form a part hereof, and in which is shown by way of illustration various embodiments in which features may be practiced. It is to be understood that other embodiments may be used and structural and functional modifications may be made.

According to aspects of the present disclosure, one or more methods, systems, apparatuses, applications, or some combination thereof, comprise an exemplary digital signature creation and a verification application and/or environment. (See FIGS. 1-4). One or more aspects of an exemplary application and/or environment are described herein. One or more aspects of an exemplary back-end system are described or illustrated herein as well. As noted above, aspects of the present disclosure enable the creation and verification of electronically verifiable signatures for use in any instance where a signature—whether physical or electronic—may be used or required. This verifiable signature provides proof of the purpose, identity, voluntariness, and authenticity of a signature.

According to aspects of the present disclosure, one or more signors activates an application executing on a computing device, e.g., phone, tablet, laptop, computer, etc., or a website via an appropriate viewer or browser. A signor authenticates herself using an appropriate method or means, such as but not limited to, one or more biometric identifiers, a fingerprint, a password, other authenticating method or information, or some combination thereof. Once the signor has been appropriately authenticated, the signor may provide information regarding the purpose and/or circumstances of the signature, and the application/website may be collected additional information regarding the signor, the act of signing, or some combination thereof. By way of demonstration but not limitation, the additional information may include location (e.g., GPS coordinates), photograph of the signor or other appropriate image, environmental data such as attendant sounds or voices, etc.

According to aspects of the present disclosure, the application/website may thereafter send or otherwise transmit the information to a server, data store, or other appropriate device or location, wherein one or more processes, methods, or systems may use this information to generate a unique identifier, also referred to as a "token". The token may then be sent or otherwise transmitted to the application/website, such that the token may be provided to the signor to use or adopt as their signature or as part of their signature. In some embodiments, the generated token is available in long or short formats, such as but not limited to, a multiple digit/alphanumeric/symbolic string or a URL.

According to aspects of the present disclosure, once a token is affixed or otherwise used as a signature or a part thereof, a third party may use the token to verify the authenticity of the signature, as well as the purpose of the signature and/or the other attendant or provided information. In some embodiments, the purpose and attendant/provided information is restricted or otherwise unavailable, based on one or more privacy settings of the signor or as otherwise desired or required, such as but not limited to, statute, regulation, or applicable law. In some embodiments, the system is used or otherwise used by a signor via a smart phone application, such as an Android/iPhone application or one or more websites, and a third party verifying a signature uses the smart phone application or website suited for the purpose.

According to aspects of the present disclosure, an exemplary signature creation environment, processes, and functionality, is demonstrated in FIG. 1. This diagram represents an operating environment in which certain embodiments may be carried out. In this example, a computing environment of a user 100 can include multiple clients connected to the Internet 101. In certain embodiments, a laptop 110 is connected 130 to the Internet 101. In certain embodiments, a smart phone 111 ins connected 131 to the Internet 101. In certain embodiments, a tablet 112 is connected 132 to the Internet 101. In certain embodiments, a reader (not shown), game console (not shown), smart television (not shown) and the like are connected to the Internet 101. In certain embodiments, a network of servers 120,122 connected through a network 135,136 to a database 121 and each server 120,122 is connected 133,134 to the Internet 101.

Figure 2:
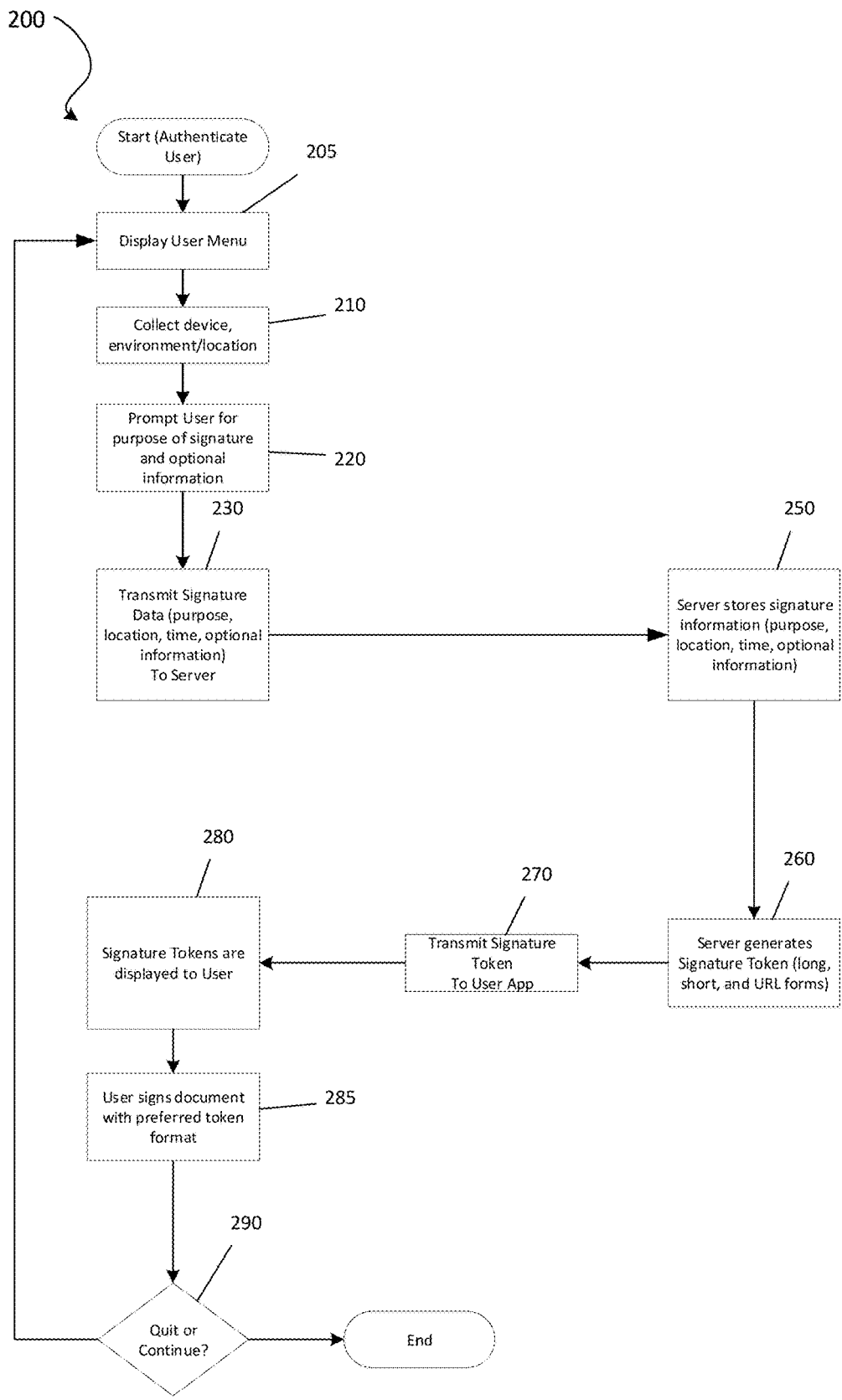
FIG. 2 illustrates an exemplary flowchart of an exemplary signature creation process and functionality, according to various aspects described herein.

According to aspects of the present disclosure, an exemplary signature creation process is demonstrated in FIG. 2. In this example, a signor starts the process at 200. A user menu may be displayed to the signor at 205, e.g., via an application or website, whereby the process may collect device information, environmental information, location information, and other appropriate information at 210. At 220, the signor may be prompted for the signature and other information, as may be desired, required, or appropriate. Then at 230, the signature information (e.g., purpose, location, time, other information, etc.) may be transmitted to one or more servers, whereby the transmitted information may be stored in one or more databases, data stores, other appropriate storage devices/methods, or some combination thereof, at shown at 250.

A signature token may then be generated, at 260, whereby the signature token may take a short format (e.g., a numeric string or symbols), a long format (e.g., an alphanumeric string), a URL/URI format (e.g., http dGluZy4u at the signa.tech website), or other appropriate format. For example, The ID of a signature is encoded using a reversible pseudo-random algorithm (RPR) to create the token. Generally speaking, a RPR makes brute-force guessing a token practically impossible. In some embodiments, the short format token is a "hashed" version of a long format token. In other words, the processes, methods, and systems described herein may initially generate a long format token and then apply one or more algorithms intended to shorten the token to allow the processes, methods, and systems to determine that a short format token corresponds to a long format token and/or signor. Then at 270, the signature token may be transmitted back to the requesting application, requesting website, or other suitable destination. In this example, the signature token(s) is displayed to the signor at 280, and the signor may then use or incorporate the token as part of their signature to sign a document(s) with the appropriate token format. If the signor elects to continue using the illustrated token creation process at 290, the process returns to 205; otherwise, the process ends.

Figure 3:
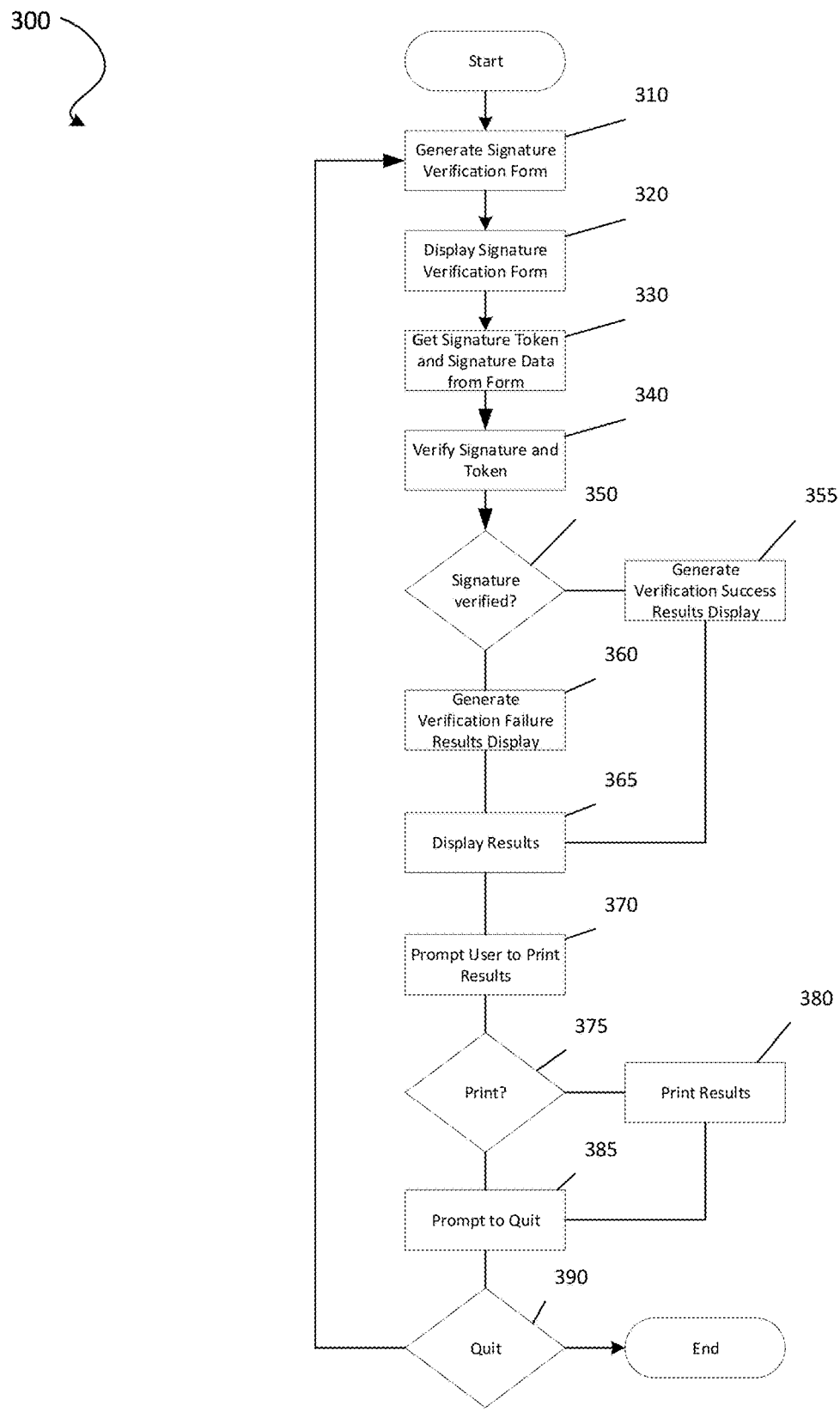
FIG. 3 illustrates an exemplary flowchart of an exemplary signature verification process and functionality, according to various aspects described herein.

According to aspects of the present disclosure, an exemplary signature verification process is demonstrated in FIG. 3. In this example, shown at 300, the process starts at 310, where one or more signature verification forms or displays are generated, then displayed to the user at 320. The user may provide a signature token (and, as appropriate, other relevant signature data) via the form(s). At 330, the provided signature token and data are used to verify the signature and token at 340. In some embodiments, if the third party provides a short format token for verification, the third party may be prompted or required to provide additional information about the act of signing such as the signing date and last name of the signor for verification. Referring back to the RPR described above, in the unlikely case where the third party correctly guessed a token, there is a near-zero chance that it would be for the specific individual. In some embodiments, version information is encoded in the token, such that the RPR can be updated or changed without impacting the validity or ability to verify the token.

If the signature is verified at 350, verification success results are generated or otherwise determined at 355. If the signature is not verified at 350, verification failure results are generated or otherwise determined at 360. These results, success or failure, may be displayed or otherwise provided at 365. In this example, the user may then be prompted to print (or otherwise preserve) the results at 370. If the user elects to print at 375, the results may be printed (or otherwise preserved) at 380. The user may then be prompted at 385 to quit the verification process. If the user elects to quit at 390, the process ends; otherwise, the process continues at 310.

Figure 4:
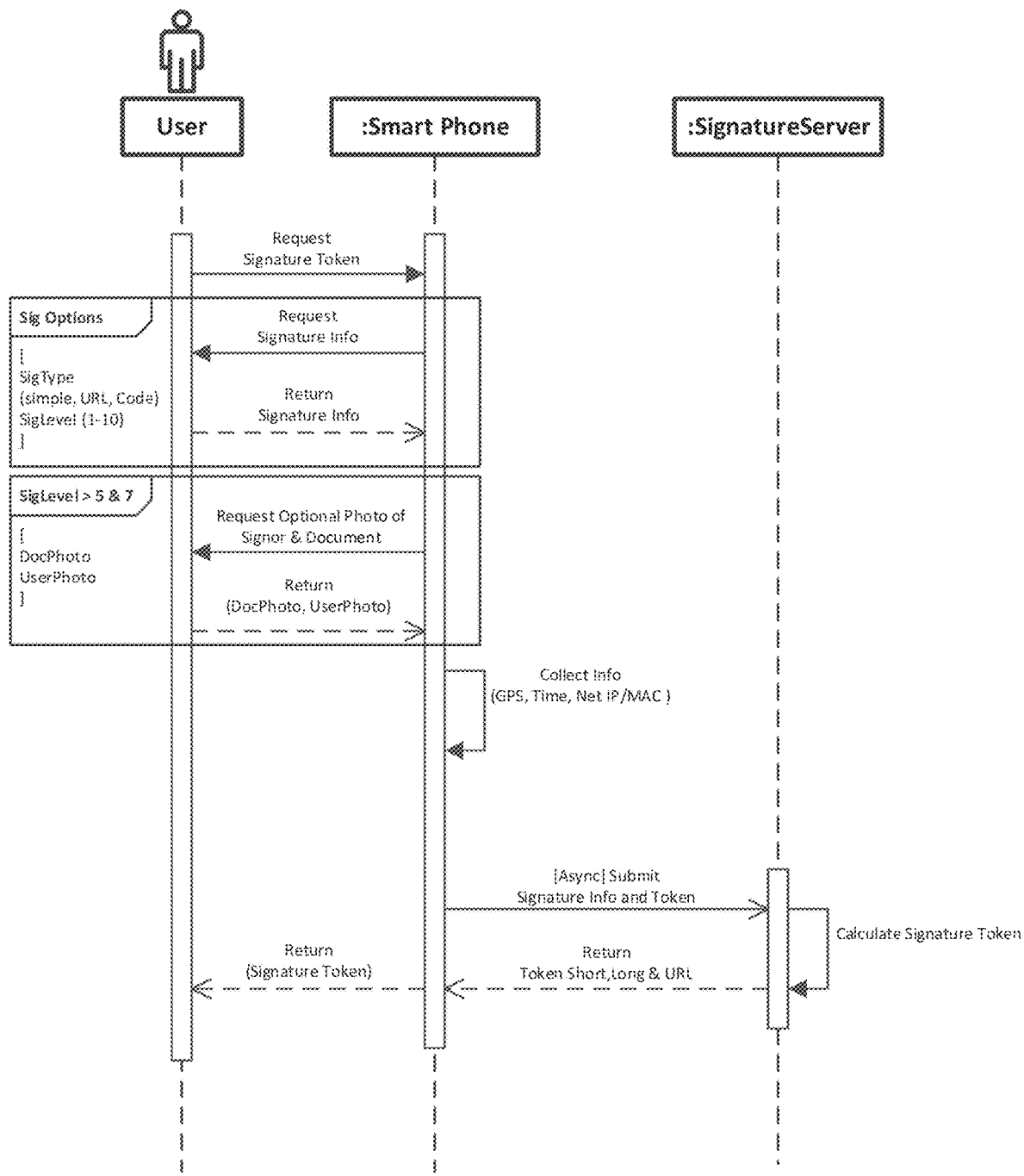
FIG. 4 illustrates an exemplary sequence diagram of an exemplary signature verification process and functionality, according to various aspects described herein.

According to aspects of the present disclosure, an exemplary process sequence diagram of this exemplary signature verification process is demonstrated in FIG. 4. In some embodiments, the processes, methods, and systems described throughout may use a "signature level" (alternately, "SigLevel"), such as that demonstrated in FIG. 4. In this example, "SigLevel" may indicate an internal representation of the level of confidence with respect to a signature's authenticity. For example, a signor may have to verify an account with a cellular phone or mobile device to receive a level greater than 1. In this example, information collected such as the GPS location may raise or increment the confidence level. Furthermore, optional information provided by the signor, through the app, such as a photo of the document or photo of the signor, may additionally raise the confidence level as well. Advantageously, a sufficiently high confidence level in the authenticity of the signature may allow the described token-based signatures to replace (or be the functional equivalent) of a notarized signature.

Figure 5:
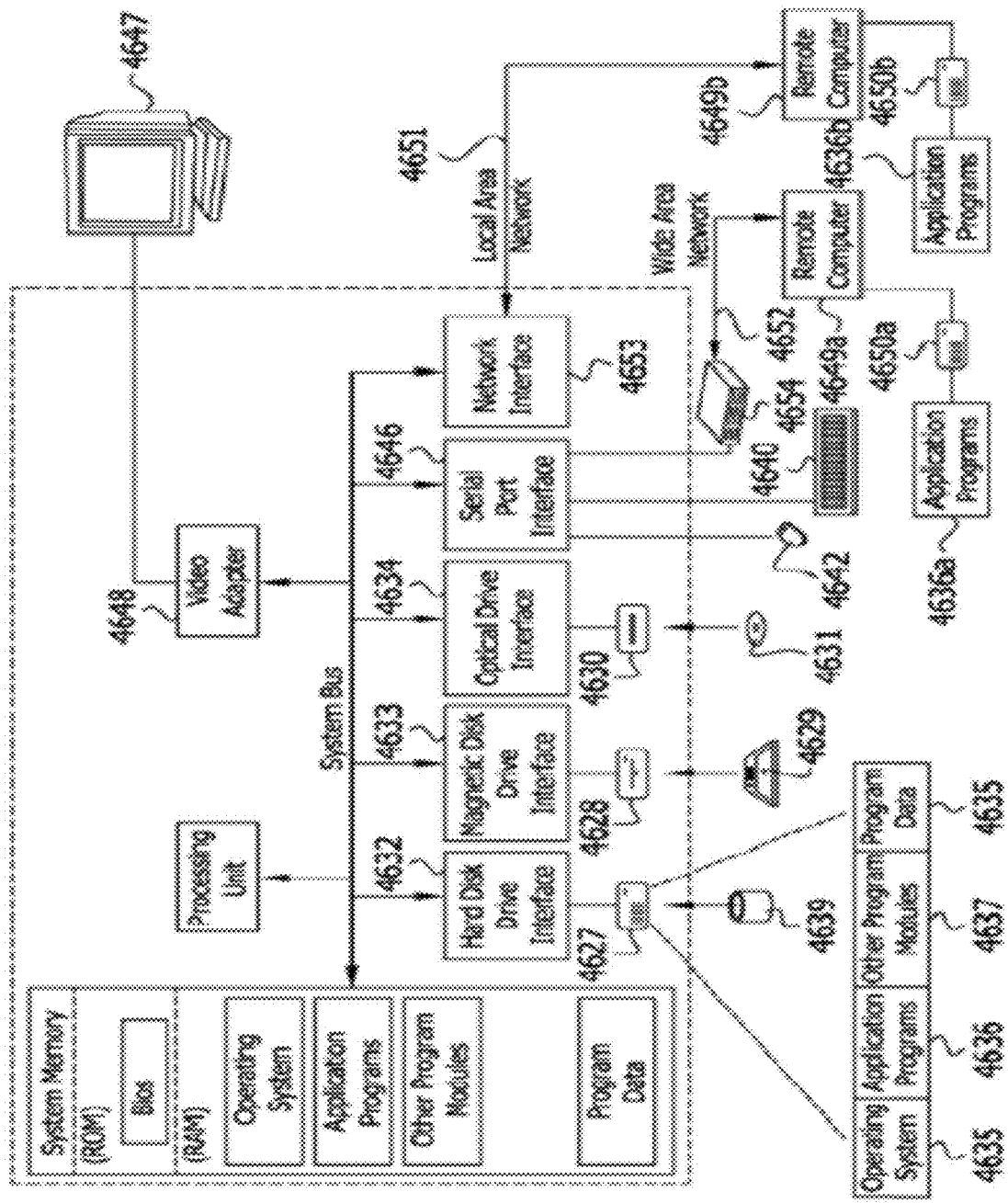
FIG. 5 is a block diagram illustrating an example of a suitable computing system environment in which aspects of the present disclosure may be implemented.

With reference to FIG. 5, an exemplary system for implementing aspects of the disclosure includes a general-purpose computing device in the form of a conventional computer 4620, including a processing unit 4621, a system memory 4622, and a system bus 4623 that couples various system components, including the system memory 4622 to the processing unit 4621. The system bus 4623 may be any of several types of bus structures, including a memory bus or memory controller, a peripheral bus, and a local bus using any of a variety of bus architectures. The system memory includes read only memory (ROM) 4624 and random-access memory (RAM) 4625. A basic input/output system (BIOS) 4626, containing the basic routines that help transfer information between elements within the computer 4620, such as during start-up, may be stored in ROM 4624.

The computer 4620 may also include a magnetic hard disk drive 4627 for reading from and writing to a magnetic hard disk 4639, a magnetic disk drive 4628 for reading from or writing to a removable magnetic disk 4629, and an optical disk drive 4630 for reading from or writing to removable optical disk 4631, such as a CD-ROM or other optical media. The magnetic hard disk drive 4627, magnetic disk drive 4628, and optical disk drive 4630 are connected to the system bus 4623 by a hard disk drive interface 4632, a magnetic disk drive-interface 4633, and an optical drive interface 4634, respectively. The drives and their associated computer-readable media provide nonvolatile storage of computer-executable instructions, data structures, program modules, and other data for the computer 4620. Although the exemplary environment described herein employs a magnetic hard disk 4639, a removable magnetic disk 4629, and a removable optical disk 4631, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 4639, magnetic disk 4629, optical disk 4631, ROM 4624, and/or RAM 4625, including an operating system 4635, one or more application programs 4636, other program modules 4637, and program data 4638. A user may enter commands and information into the computer 4620 through keyboard 4640, pointing device 4642, or other input devices (not shown), such as a microphone, joystick, game pad, satellite dish, scanner, or the like. These and other input devices are often connected to the processing unit 4621 through a serial port interface 4646 coupled to system bus 4623. Alternatively, the input devices may be connected by other interfaces, such as a parallel port, a game port, or a universal serial bus (USB). A monitor 4647 or another display device is also connected to system bus 4623 via an interface, such as video adapter 4648. In addition to the monitor, personal computers typically include other peripheral output devices (not shown), such as speakers and printers.

The computer 4620 may operate in a networked environment using logical connections to one or more remote computers, such as remote computers 4649a and 4649b. Remote computers 4649a and 4649b may each be another personal computer, a server, a router, a network PC, a peer device or other common network node, and typically include many or all the elements described above relative to the computer 4620, although only memory storage devices 4650a and 4650b and their associated application programs 4636a and 4636b have been illustrated in FIG. 5. The logical connections depicted in FIG. 5 include a local area network (LAN) 4651 and a wide area network (WAN) 4652 presented here by way of example and not limitation. Such networking environments are commonplace in office-wide or enterprise-wide computer networks, intranets and the Internet.

When used in a LAN networking environment, the computer 4620 is connected to the local network 4651 through a network interface or adapter 4653. When used in a WAN networking environment, the computer 4620 may include a modem 4654, a wireless link, or other means for establishing communications over the wide area network 4652, such as the Internet. The modem 4654, which may be internal or external, is connected to the system bus 4623 via the serial port interface 4646. In a networked environment, program modules depicted relative to the computer 4620, or portions thereof, may be stored in the remote memory storage device. It will be appreciated that the network connections shown are exemplary and other means of establishing communications over wide area network 4652 may be used.

One or more aspects of the disclosure may be embodied in computer-executable instructions (i.e., software), such as a software object, routine or function (collectively referred to herein as a software) stored in system memory 4624 or non-volatile memory 4635 as application programs 4636, program modules 4637, and/or program data 4638. The software may alternatively be stored remotely, such as on remote computer 4649a and 4649b with remote application programs 4636b. Generally, program modules include routines, programs, objects, components, data structures, etc. that perform particular tasks or implement particular abstract data types when executed by a processor in a computer or other device. The computer executable instructions may be stored on a computer readable medium such as a hard disk 4627, optical disk 4630, solid state memory, RAM 4625, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

A programming interface (or more simply, interface) may be viewed as any mechanism, process, or protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are used in a run-time system or process, or whether they are located on the same or different machines or distributed across multiple machines, or whether the functionality represented by the segments of code are implemented wholly in software, wholly in hardware, or a combination of hardware and software. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the provided detailed description. Some illustrative implementations of a programming interface may also include factoring, redefinition, inline coding, divorce, rewriting, to name a few. There are, however, other ways to implement a programming interface, and, unless expressly excluded, these, too, are intended to be encompassed by the claims set forth at the end of this specification.

Embodiments within the scope of the present disclosure also include computer-readable media and computer-readable storage media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general-purpose computer, special purpose computer, or special purpose processing device to perform a certain function or group of functions Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing aspects of the present disclosure.

What is claimed is:

1. A computerized method for signing a document with a digital token, the method comprising:

collecting, from a user device of a signor, device information regarding the device, the device information including location data of the device;

receiving, via the user device, signature information from the signor, the signature information including data indicating a purpose of a signature, wherein the signature information further comprises at least one of a photograph of the one or more documents, a photograph of the signor, and one or more biometric identification elements of the signor;

transmitting, from the user device, the signature information to a server via a network;

generating, by the server, a signature token based on the received signature information, wherein the generating comprises encoding the signature token using a reversible pseudo-random algorithm;

transmitting, by the server, the signature token to the user device;

signing, by the signor on the user device, one or more documents using the transmitted signature token.

2. The computerized method of claim 1, wherein the method further comprises determining, by the server, a signature level of the signing of the one or more documents.

3. The computerized method of claim 2, wherein the signature level is determined based on at least one of the device information and the signature information.

4. The computerized method of claim 1, further comprising storing, by the server, the signature information to one or more data stores.

5. The computerized method of claim 1, wherein signing the one or more documents using the transmitted signature token provides proof of the purpose, identity, voluntariness, and authenticity of a signature as well as one additional information comprising one or more of:

a photograph of the signor;

environmental data; or any combination thereof.

6. A server, comprising:

at least one memory storing computer program instructions; and at least one processor configured to execute the computer program instructions to cause the server at least to:

collect, at a user device of a signor, device information regarding the device, the device information including location data of the device;

collect signature information, from signor input at the user device, signature information including data indicating a purpose associated with a signature of the signor, wherein the signature information further comprises at least one of a photograph of the one or more documents, a photograph of the signor, and one or more biometric identification elements of the signor;

receive, from the user device, the signature information and device information via a network to the server;

generate, at the server, a signature token based on the received signature information, wherein the generating comprises encoding the signature token using a reversible pseudo-random algorithm; and transmit, from the server to the user device, the signature token to enable signing, by the signor on the user device, one or more documents using the transmitted signature token.

7. The server of claim 6, wherein the computer program instructions to further cause the server at least to determine, at the server, a signature level of the signing of the one or more documents.

8. The server of claim 7, wherein the signature level is determined based on at least one of the device information and the signature information.

9. The server of claim 6, wherein the signature information further comprises proof of purpose, identity, voluntariness, and authenticity of the signature.

10. The computerized method of claim 5, wherein the environmental data are attendant sounds.

\* \* \* \* \*